United States Patent [19]

Karetnikov et al.

[11] Patent Number: 5,197,304

[45] Date of Patent: Mar. 30, 1993

[54] DEVICE FOR TREATMENT OF TEXTILE MATERIALS

[76] Inventors: Evgeny V. Karetnikov, ulitsa 4 Kuryanovskaya, 21, kv. 5; Valentin M. Spitsin, ulitsa 4 Volgogradskaya, 22, kv. 1; Sergei F. Grishin, prospekt Textilschikov, 117 B, kv. 36; Boris L. Gorberg, ulitsa Polka "Normandia Neman", 86, kv. 259; Andrei A. Ivanov, ulitsa Rabfakovskaya, 18, kv. 2, all of Ivanovo, U.S.S.R.

[21] Appl. No.: 695,589

[22] Filed: May 3, 1991

[51] Int. Cl.$^5$ .............................. D06B 3/32
[52] U.S. Cl. ...................... 68/5 C; 68/180; 204/134
[58] Field of Search ............... 68/5 C, 5 D, 5 E, 180; 204/134

[56] References Cited

U.S. PATENT DOCUMENTS

| 666,056 | 1/1901 | Jackson et al. | 68/180 |
| 2,371,145 | 3/1945 | Brubaker | 204/134 |
| 3,753,307 | 4/1976 | Supaneker et al. | 204/134 |

FOREIGN PATENT DOCUMENTS

| 3302316 | 1/1983 | Fed. Rep. of Germany. | |
| 366259 | 2/1963 | Switzerland | 68/180 |
| 164980 | 6/1921 | United Kingdom | 68/180 |
| 2092190 | 8/1982 | United Kingdom | 68/180 |

OTHER PUBLICATIONS

Article "International Dyer & Textile Printer" 4 Pages.

*Primary Examiner*—Frankie L. Stinson
*Attorney, Agent, or Firm*—Ladas & Parry

[57] ABSTRACT

A device for treatment of textile materials comprises a cover fixedly mounted on a base and a hollow housing movable on said base along its longitudinal axis. The hollow housing accomodates, on both sides of the axial plane thereof, technological equipment for the treatment of textile materials and doffers for rolls of textile materials. The doffers are mounted in supports, one support being secured on the cover, the other movably mounted inside the hollow housing. The doffers are installed in each support for concurrent parallel displacement depending on the variations in the diameters of the rolls wound thereon and connect to each other by a movable member made as a slider accomodated in a guide.

4 Claims, 3 Drawing Sheets

DEVICE FOR TREATMENT OF TEXTILE MATERIALS

FIELD OF THE INVENTION

This invention relates to finishing equipment of the textile industry and, in particular, to a device for treatment of a textile material, which can be used for various types of finishing processes of small batches of textile materials including low-temperature plasma treatment of fabrics.

PRIOR ART

Known in the art is a device (DE, A, 3302316) for treatment of a textile material, comprising a roll rewinding device having doffers placed in sealed housings arranged on both sides of a central housing where the plasma treatment equipment is installed. All three sealed housings are communicated to one another in succession by tunnels.

This device can be used for treatment of fabrics by low-temperature plasma, which is most efficient of the modern treatment techniques. However, this device is deficient in that the loading and unloading of rolls and servicing of mechanisms inside the housings are extremely inconvenient because of the tunnels and three sealed housings.

Quite popular are devices for treatment of Jigger type textile materials (International Dyer, June 1981, pp. 322-323). This device comprises a cover immovably mounted on a base, a hollow housing whose longitudinal axis is horizontal and which is movable along the base and its longitudinal axis in relation to the cover. The hollow housing accomodates technological equipment and doffers of the rewinding device. The bearings of the doffers are secured in supports, one of the supports being secured in the cover, while the other is installed in the hollow housing.

This device can be used to treat textile materials by liquids, e.g. for their bleaching and dyeing. The loading and unloading of rolls, as well as servicing of the device is as easy as of any known open device since the housing can be pushed away and ceases to be an obstacle.

But this device cannot be used for plasma-chemical treatment without alterations since the doffers are fixedly installed inside the hollow housing. As the fabric is being rewound from one doffer to another, the rolls of fabric occupy different space zones inside the housing. When the fabric is rewound while immersed in a liquid, this is of no consequence, but is absolutely unacceptable for plasma treatment since there is practically no space inside the housing to accomodate the electrode system. Besides, during the doffer-to-doffer rewinding, the rolls should be kept at a specific distance from the electrode system to maintain the fabric treatment technology stable.

Should the hollow housing be made much larger to accomodate easily both the rolls and the technological equipment, the device will become extremely bulky, its servicing much more complicated, and more expensive to manufacture. It will require more space and heavy-duty vacuum pumps, large amounts of power for each treatment cycle. This is uneconomical and unrealizable for most small-scale textile factories.

SUMMARY OF THE INVENTION

The object of this invention is to improve the efficiency of the device.

Another object of the invention is to provide high quality of textile material treatment.

One more object of the invention is to make servicing of the device simpler.

This is achieved by that in a device for treatment of a textile material, comprising a cover fixedly installed on a base, a hollow housing having a horizontal longitudinal axis and movable on said base along the longitudinal axis thereof in relation to said cover, technological equipment for treatment of a textile material, which is accomodated in the hollow housing, and two supports carrying the bearings of two doffers for winding a textile material, one support being secured on the cover, while the other is fixedly mounted in the hollow housing. According to the invention, the technological equipment for treatment of a textile material and doffers are arranged inside the hollow housing on different sides of the axial plane thereof, the doffers being mounted in each support for joint parallel displacement depending on the changes in the diameter of the rolls wound thereon and connected to each other by a movable member.

Each support should preferably comprise a guide wherein a movable member is provided in the form of a slider carrying the bearings of the doffers, this slider being connected with a driving screw-type device driving it along the guide, and a roll diameter control sensor is provided near one of the doffers and connected to the drive of the screw-type device.

The device according to the invention achieves the purpose of compact arrangement of supports with doffers and technological equipment for treatment of a textile material inside the housing without making this housing larger in size. Since the doffers are capable of concurrent parallel movement, which is achieved by simple means (a slider moving on a guide), it becomes possible to accomodate, within a space intended for a maximum diameter of only one roll, two rolls, including the unwinding roll of a textile material and the receiving roll on which the treated textile material is wound. This permits the use of larger rolls and, in this manner, treatment a larger amount of material in one cycle. The efficiency of the device is thus substantially improved.

Since the rolls do not practically occupy any volume intended for the technological equipment and in no way interfere with the technological processes, the quality of treatment of a textile material can be maintained on a high level. The housing can be shifted in relation to the cover and supports with doffers and free access provided to any unit of the device, which is extremely important for easy servicing.

To summarize, the herein proposed design of the doffer supports and their arrangement make it possible to provide small-size easily automatable equipment, e.g. for the plasma-chemical treatment of textile materials, suitable for minor textile facilities. In addition, an important advantage of this invention consists in that a small-batch treatment of fabrics by plasma of different compositions can be organized in order to obtain various technological effects.

This combination of large output capacity, a high degree of automation, and easy accessibility of all units for servicing and repair constitutes the advantages of this device as contrasted to known similar ones.

BRIEF DESCRIPTION OF THE DRAWINGS

The invention will now be described in more detail, by way of example, with reference to the accompanying drawings, wherein.

DETAILED DESCRIPTION OF THE INVENTION

Figure 1:
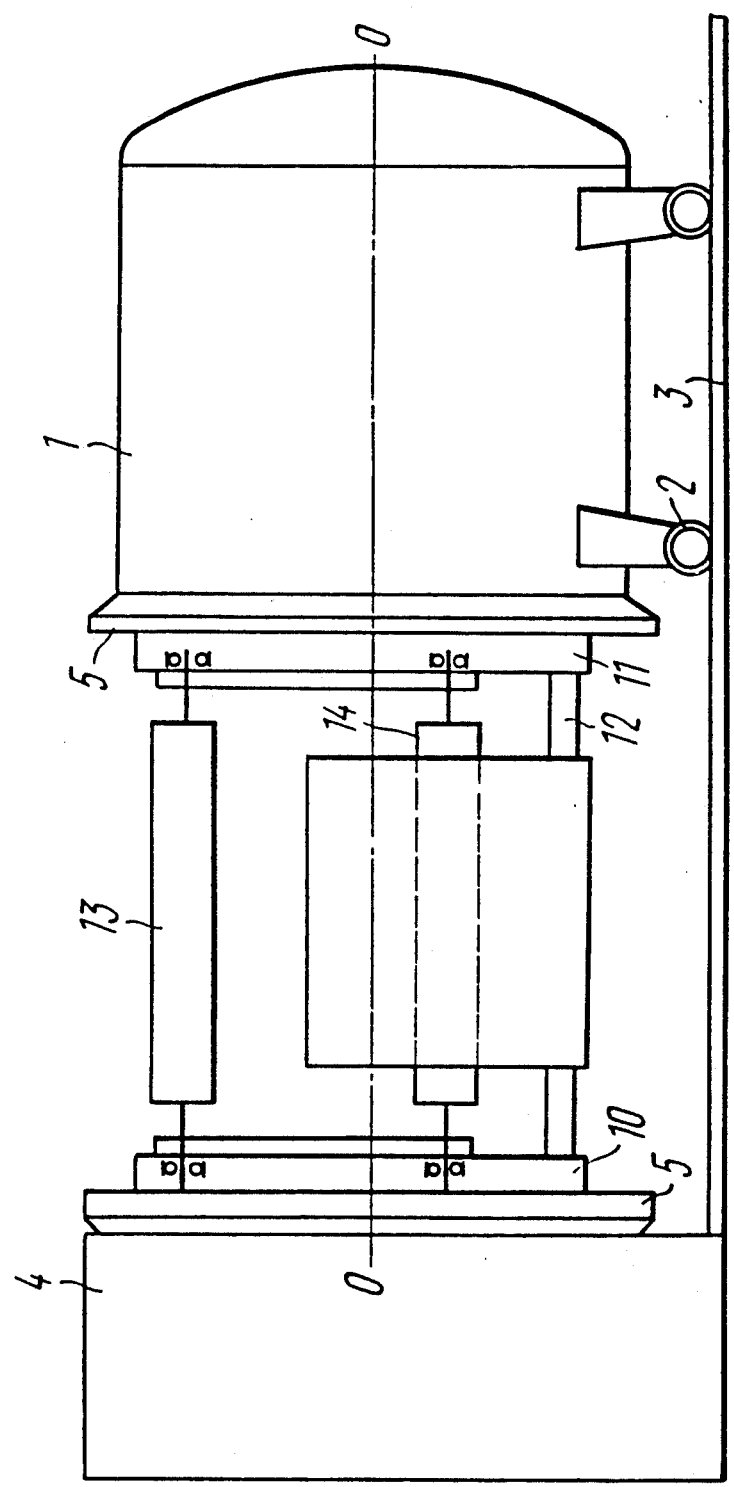
FIG. 1 shows a general view of a device for treatment of textile materials with the housing opened, according to the invention.

The device for treatment of textile materials, e.g. plasma-chemical treatment, comprises: a hollow housing 1 (FIG. 1) having a horizontal longitudinal axis 0—0 and installed on wheels 2 to be displaced on a base 3 along the longitudinal axis 0—0 in relation to a cover 4 fixedly secured on the base 3 and sealed to the hollow housing 1 by flanges 5; technological equipment 6 (FIG. 2) for treatment of a textile material 7, which comprises an electrode system 8 and guide rollers 9 for loop-like displacement of the material 7; two supports 10 and 11 (FIG. 1) connected to each other by a bar 12 and carrying the bearings of doffers 13 and 14 for winding the textile material 7 during the treatment process. The support 10 is secured on the cover 4, while the support 11 is mounted inside the hollow housing 1 by a known method like in all "jiggers" to ensure the displacement of the hollow housing 1 in relation to the cover 4, while the supports 10 and 11 with the doffers 13 and 14 retain their position.

The technological equipment 6 (FIG. 2) and doffers 13 and 14 are arranged, inside the hollow housing 1, on both sides of the axial plane N thereof, that is the vertical plane extending through the longitudinal axis 0—0. This makes it possible to provide compact arrangement of all units inside the hollow housing 1. To keep the textile material 7 in a specific position in relation to the technological equipment 6, the doffers 13 and 14 are connected to each other by a movable member, e.g. a slider 15, and are mounted in each support 10 and 11 for concurrent parallel displacement depending on the changes in the diameters of the roll of textile materials wound thereon. For this purpose, each support 10 and 11 is provided with a guide 16 (FIG. 3) in which the slider 15 is installed. The slider 15 accomodates bearings 17 of the doffer 13 and bearings 18 of the doffer 14.

Figure 2:
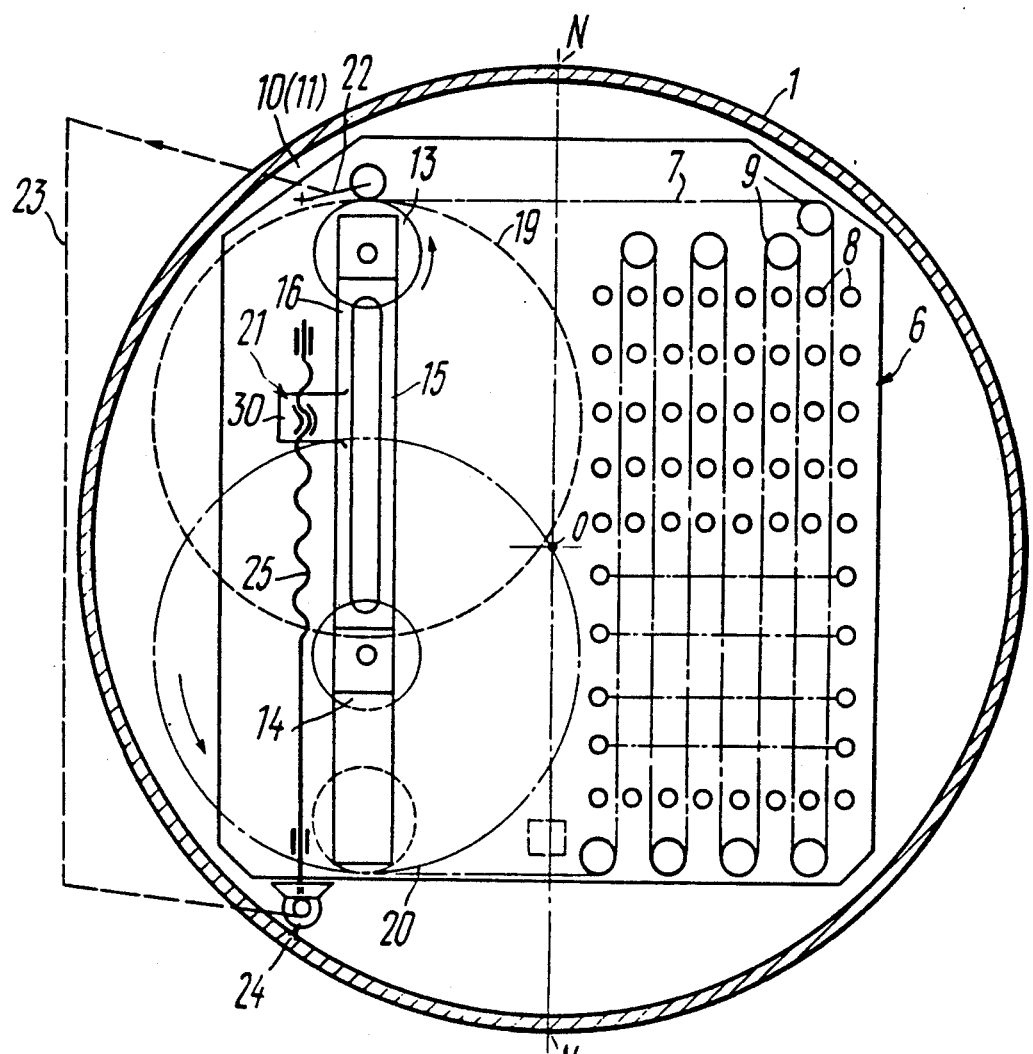
FIG. 2 shows a side view of schematic arrangement of supports with doffers and technological equipment inside a hollow housing of the device in FIG. 1.

The length of the slot of the guide 16 for the displacement of the slider 15 is selected so that the maximum diameter of the rolls 19 (FIG. 2) and 20 in the upper and lower positions respectively, as shown in FIG. 2 by dash and dash-anddot lines respectively, should ensure a specific position of the unwinding and/or winding textile material in relation to the guiding rollers 9 of the technological equipment 6. For this purpose, the slider 15 is connected with a driving screw-type device 21 to displace the slider 15 along the guide 16; a roll diameter sensor 22 which is electrically connected via an electric circuit 23 of a known automatic system to a drive 24 of the screw-type device 21 is positioned near one of the doffers 13 or 14.

The roll diameter sensor 22 may be any known sensor used nowadays in the textile industry, which comprises, for example, a swivel arm with a roller and an electric magnet connected via the circuit 23 to a control unit (not shown) of the drive 24. The control unit may be any unit known to persons skilled in the art, which is capable of automatically turning the drive 24 on for forward or reverse operation.

The screw-type device 21 (FIG. 3) for displacement of the slider comprises a screw 25 having one end connected to a shaft 26 of one of the gear wheels 27 of the drive 24 and theo other end rotatable in a bracket 28 secured on the guide 16. The screw 25 is equipped with a nut 29 secured in a bracket 30 fixed on the slider 15 which can be displaced as the screw 25 turns.

The doffers 13 and 14 are rotated by drives 31 and 32 made in a conventional manner and known transmission units 33 and 34 capable of transmitting rotational movement to the doffers 13 and 14.

The device for treatment of textile materials operates as follows.

The textile material 7 (FIG. 2) to be treated is rewound from the roll 19 on the doffer 13 onto the roll 20 on the doffer 14, extending in a loop-like fashion through the electrode system 8 of the technological equipment 6, wherein the textile material 7 is treated by plasma produced by a known method. As the rewinding progresses, the configuration of the rolls 19 and 20 changes, the roll 20 increasing in size, while the roll 19 is deceasing. The rolls seem to shift the mass of the textile material and the collision with the wall of the housing 1 looks imminent.

Figure 3:
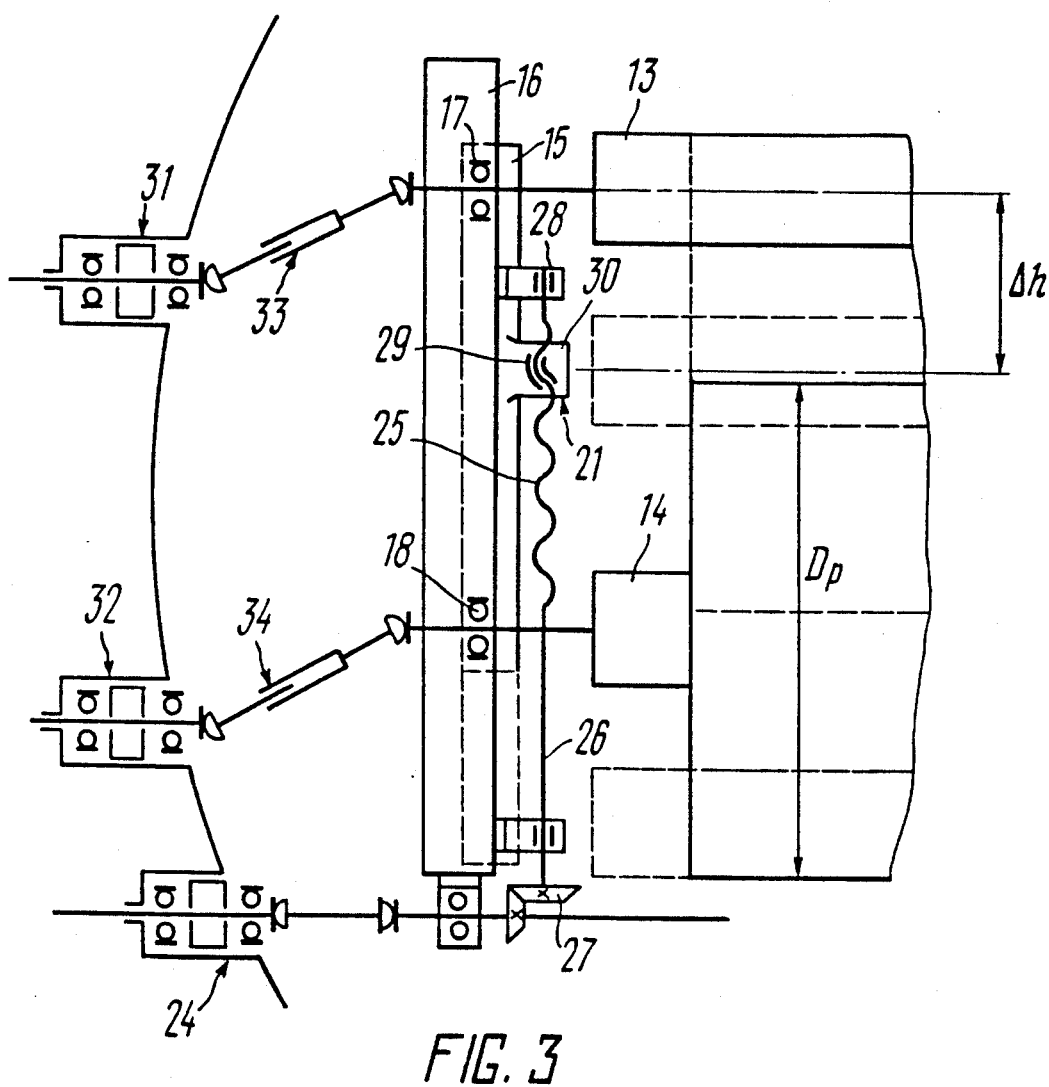
FIG. 3 shows an enlarged view of a schematic of a support of a doffer.

To prevent this collision, the sensor 22 detects the change in the diameter of the roll 19 and delivers a signal to the drive 24 of each support 10 and 11 making the screw 25 turn in the nut 29 to displace the slider 15 together with the doffers 13 and 14 and the rolls 19 and 20 (FIG. 3) fit thereon to, for example, elevate them. The new position of the doffers and rolls is shown in FIG. 3 by dash lines. For a repeated treatment cycle of the textile material 7, the screw 25 is rotated in the reverse direction and the reverse roll-to-roll winding of the material is performed. It is important that the attitude of the textile material 7 in relation to the technological equipment remains unchanged whatever the displacement of the doffers and the treatment process is not disrupted.

When the textile material treatment is over, the technological equipment is switched off, the drives 31 and 32 for the doffers 13 and 14 and the screwtype device 21 is disconnected, the housing 1 (FIG. 1) is shifted along the base 3 from the cover 4. Since the support 10 of the doffers is fixedly secured on the cover 4, the doffer 13 is uncovered together with the roll and can be removed for further treatment and replaced by a new roll on a doffer. The housing 1 is then brought, together with the technological equipment, to the initial position and tightly connected with the cover; the drives and technological equipment are switched on again and the next treatment process can be started.

The herein proposed construction of supports and doffers and their arrangement with respect to a technological equipment make it possible to accommodate both the unwinding and rewinding rolls in one space inside the housing. This space could be used for installing larger rolls of textile materials without expanding the housing and disturbing the technological process of treatment. This permits a higher efficiency of the device and a simpler servicing procedure.

What is claimed is:

1. A device for treatment of textile materials, comprising: a base; a cover fixedly mounted on said base; a hollow housing having a horizontal longitudinal axis and installed so it can be displaced on said base along said longitudinal axis in relation to said cover; technological equipment for the treatment of textile materials accommodated in said hollow housing; a first support secured on said cover; a second support movably mounted in said hollow housing so it can be displaced in relation to the first support; two doffers to carry rolls of textile materials, each having two ends installed so that one end is mounted on bearings in the first support, while the other end is mounted on bearings in the second support; means for concurrent parallel displacement of said doffers with respect to said supports so as to enable said doffers to be selectively placed in one of at least two positions within said housing, said rolls carried on said doffers being spaced from said technological equipment with said doffers in either of said at least two positions and said technological equipment and said doffers being arranged inside said hollow housing on different sides of an imaginary axial plane extending through the longitudinal axis of said hollow housing with said doffers in either of said at least two positions, whereby the means can be used to displace the doffers to enable the housing to accommodate variations in diameters of the rolls.

2. A device for treatment of textile materials, as claimed in claim 1, wherein said means comprises a movable member connecting said doffers to each other in each of said supports, said device being provided with a guide mounted in each of said supports and accommodating the movable member in each said support, the movable member in each support accommodating the bearings of said doffers in each support.

3. A device as claimed in claim 2 further comprising screw-type means connected to each of said movable members for propelling the movable members along their respective guides.

4. A device as claimed in claim 3 comprising a sensor for determining the diameter of the roll carried by at least one of said doffers, said sensor being electrically connected to said screw-type means whereby it can signal said screw-type means to propel each of the movable members along its respective guide thereby to cause concurrent parallel displacement of said doffers.

* * * * *